T. F. GLENN.
MOLD FOR FORMING ARTIFICIAL TEETH.
APPLICATION FILED AUG. 1, 1917.

1,346,951.

Patented July 20, 1920.

Witness
Edward F. Sampson

Inventor
Thomas F. Glenn,
By Clifton C. Callwell
Attorney

UNITED STATES PATENT OFFICE.

THOMAS F. GLENN, OF ARDMORE, PENNSYLVANIA, ASSIGNOR TO THE S. S. WHITE DENTAL MANUFACTURING COMPANY, A CORPORATION OF PENNSYLVANIA.

MOLD FOR FORMING ARTIFICIAL TEETH.

1,346,951.   Specification of Letters Patent.   Patented July 20, 1920.

Application filed August 1, 1917. Serial No. 183,840.

*To all whom it may concern:*

Be it known that I, THOMAS F. GLENN, a citizen of the United States, and a resident of Ardmore, in the county of Montgomery, State of Pennsylvania, have invented certain new and useful Improvements in Molds for Forming Artificial Teeth, of which the following is a specification, reference being had to the accompanying drawings.

My invention relates particularly to tooth-forming molds which are adapted not only to form the tooth, but also to form a recess therein whereby it may be anchored to a suitable mounting, and is especially directed to the means in said mold for forming said recess.

The principal object of my invention is to provide a tooth-forming mold so constructed and arranged that the teeth molded therein may be readily withdrawn therefrom without danger of fracture.

Other objects of my invention are to provide a tooth-forming mold with a recess-forming member which is so related to the wall of the mold that the tooth produced therein may have guiding surfaces in relatively spaced parallel planes, whereby it may be guided in a rectilineal movement with respect to the mold or mounting to which it may be attached, so as to be conveniently withdrawn from the mold or mounting or replaced on the latter.

Specifically stated, the form of my invention as hereinafter described comprehends a tooth-forming mold provided with a mold cavity having a "bite" forming surface and a tongue or projection extending into said mold cavity in substantially parallel relation with said surface and arranged to form a recess in the teeth molded in said cavity.

My invention also includes all of the various novel features of construction and arrangement hereinafter more definitely specified.

Figure 1:
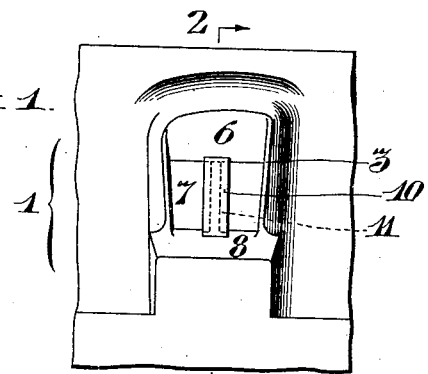
Figure 2:
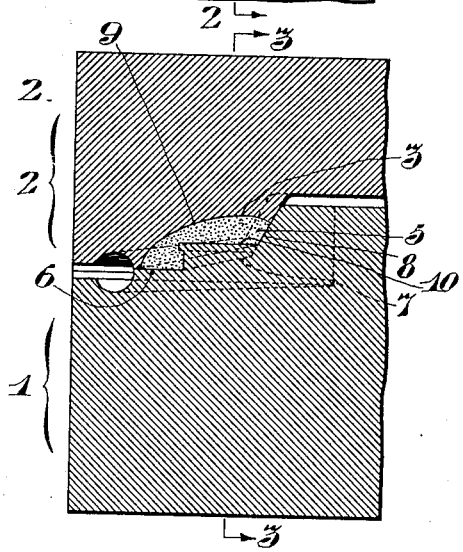
Figure 3:
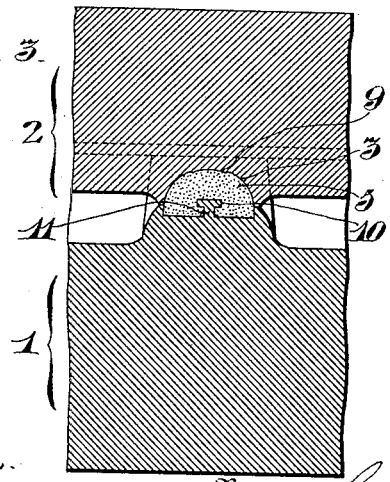

In the accompanying drawings, Figure 1 is a fragmentary plan view of the base or lower part of the mold showing the recess-forming tongue or projection; Fig. 2 is a vertical sectional view taken transversely through the mold and longitudinally of the tooth cavity, showing the upper and lower parts of the mold and the tooth molded in said cavity, also in section, and Fig. 3 is a vertical sectional view of the mold and tooth shown in Fig. 2 taken on the line 3—3 in said figure.

In said figures, the mold comprising the lower part or base 1 and the upper part or cap 2 is provided with the tooth-forming cavity 3 in which teeth 5 may be molded by filling said cavity 3 with plastic tooth-forming material and forcing the parts 1 and 2 of the mold together under considerable pressure.

The mold illustrated is provided in its lower part or base 1 with the relatively inclined surfaces 6, 7 and 8 respectively forming a "bite," "shunt" and "ridge-lap" of the lingual surface of the teeth molded therein and is provided in its upper part or cap 2 with the concave surface 9, forming the labial surface of said teeth.

The mold is also provided with a tongue or projection 10 extending into the mold cavity preferably from the lower mold part 1 and in substantially parallel relation with the "bite" forming surface 6, and having a web 11 of less width than the tongue 10 proper, connecting said tongue and "shunt" forming surface 7.

It will be readily seen that the tongue 10 will provide a recess in the tooth 5 disposed in substantially parallel relation with the "bite" surface and that the web 11 will produce a slot in the "shunt" of said tooth, connecting with said recess.

It will also be obvious that by reason of the parallel relation of the tongue 10 and the "bite" forming surface 6, the molded tooth 5 may not only be readily removed from the mold without danger of fracture, but it may be conveniently attached to and detached from its mounting, whether such mounting be a bridge, post, plate or any other form of tooth support.

It is to be understood that while I have shown but a fragmentary part of the mold in which but one tooth is illustrated, any desired number of teeth may be produced in a single mold.

Although I have chosen to illustrate the tongue 10 in parallel relation with the "bite" forming surface, it will be obvious that similar advantages may be obtained by directing the tongue in parallel relation with respect to the inclined surface forming the "ridge-lap," and therefore, I do not desire to limit my invention to the precise details of construction and arrangement herein set forth, as it is obvious that various modifications may be made therein without departing from the essential features of my invention as defined in the appended claims.

Having thus described my invention, I claim:

1. A tooth-forming mold having a mold cavity providing relatively angular surfaces forming the lingual face of the tooth and having a tongue or projection extending into said cavity, and having overhanging members inclined forwardly in parallel relation with one of said surfaces.

2. A tooth-forming mold having a mold cavity and comprising separable parts, providing "bite," "shunt" and "ridge-lap" forming surfaces and having a tongue or projection having flanges extending into said cavity in parallel relation with said "bite" forming surface.

In witness whereof I have hereunto set my hand this 27th day of July, A. D. 1917.

THOMAS F. GLENN.

Witnesses:
HARRY R. BARBER,
CLIFTON C. HALLOWELL.

It is hereby certified that in Letters Patent No. 1,346,951, granted July 20, 1920, upon the application of Thomas F. Glenn, of Ardmore, Pennsylvania, for an improvement in "Molds for Forming Artificial Teeth," errors appear requiring correction as follows: In the grant the name of the assignee was erroneously given as "S. S. White Dental Manufacturing Company," whereas said name should have been given as *The S. S. White Dental Manufacturing Company*, as shown by the records of assignments in this office; in the printed specification, page 1, lines 68, 79, and 85, and page 2, line 17, claim 2, for the word "shunt" read *shut;* and that the said Letters Patent should be read with these corrections therein that the same may conform to the record of the case in the Patent Office.

Signed and sealed this 17th day of August, A. D., 1920.

[SEAL.]

M. H. COULSTON,
*Acting Commissioner of Patents.*

Cl. 32—6.